3,366,485
PROCESS FOR PREPARING A FILLED, READY-
TO-EAT BREAKFAST CEREAL
Rolf Moen, Hopkins, and William L. McKown and Verne
E. Weiss, Minneapolis, Minn., assignors to General
Mills, Inc., a corporation of Delaware
No Drawing. Filed Sept. 1, 1964, Ser. No. 393,736
5 Claims. (Cl. 99—83)

ABSTRACT OF THE DISCLOSURE

Process for making a ready-to-eat breakfast cereal comprising laying down a sheet of workable reconstituted cereal dough, depositing a core material on the dough, laying down a second sheet of dough, sealing the dough sheets around portions of said core material to give substantially sealed dual layered pellets, and finally expanding and drying said pellets.

---

This invention relates to a breakfast cereal of the ready-to-eat variety and to a process for making the same.

In attempting to improve the savoriness, nutritional value and other qualities of ready-to-eat breakfast cereals, efforts have long been made to contrive acceptable methods of incorporating many different ingredients with the grain derived portion of the breakfast cereals, and a good deal of this effort has been directed particularly to finding desirable methods of adding fruit, fruit products, and fruit simulated products to the grain derived portion. While the problem encountered generally are, understandably, many and varied, the particular problems involved in utilizing fruit, fruit products, or fruit simulated products or the like as one of the breakfast food ingredients are especially difficult, and are, to a degree, somewhat illustrative of problems encountered generally in adding many other types of ingredients.

Mixing fresh fruit with breakfast cereal has, of course, long been a popular method of preparing a breakfast dish, so it has for many years been recognized as a desirable end to produce a fruit and cereal product that can be sold as a shelf item to the ultimate consumer, and yet keep some of the character of fresh fruit in the product. It is impractical, of course, to add fresh fruit as an ingredient to be packaged with the finished cereal product (e.g., flakes, biscuits), primarily because of the rapid rate of spoilage of the fruit. Thus the approach has been taken to add dried fruit to the finished cereal product to effect a packaged breakfast cereal having a sufficiently long "shelf life," this having been done commercially with raisins. However, there are problems and limitations in this general approach. It is not desirable to package the fruit and cereal product separately because of the inconvenience to the ultimate consumer. On the other hand, there are difficulties involved in distributing the dried fruit somewhat uniformly throughout the cereal product; and even after this has been accomplished, in the handling of the packaged product either in shipping and afterwards by the consumer, there is with some products a tendency for the fruit to separate from the cereal, and to accumulate and possibly agglomerate.

Beyond the difficulties of accumulation and agglomeration, one of the major problems in so mixing dried fruit and a cereal product is that of the gradual transfer of moisture from the fruit to the cereal product. (For clarity, in discussing generally any breakfast cereal containing a fruit or fruit simulated product, the grain derived or cereal portion, i.e., flakes, biscuits, etc., will be called the "cereal portion" or "cereal product," the fruit related portion, i.e., fruit or fruit simulated portion, will be called the "fruit portion" or "fruit product," and the combination of these, which is generally the total packaged product, will be called a "ready-to-eat cereal," or "ready-to-eat breakfast cereal," or "breakfast cereal.") What are commercially known as "dried" fruits still have a moisture content generally between fifteen (15%) percent and thirty (30%) percent, while most all cereal products must remain at or below about four (4%) percent in moisture content to stay reasonably crisp. Thus when the fruit is mixed in with the cereal product and permitted to stand for a period of time, the dried fruit will lose moisture to the cereal, with the fruit becoming excessively tough or hard (the degree of toughness depending to some extent on the selection of fruit) and the cereal becoming soggy. It has been alleged that bran flakes, being more flinty than most other flakes, do not show the effects of moisture absorption to the same extent as do the other flakes, and thus have been used in this manner (i.e., mixed with raisins) with some success. However, in this case the choice of cereal product is accordingly limited, as is the choice of fruit, and the dried fruit still has a tendency to be tough due to the dehydration thereof.

Another approach to solve the difficulties of adding fruit or fruit-like products to cereal is to encase dried fruit pieces within moist cereal shreds, and then to toast and dry the product. Although this circumvents the problems of accumulation and agglomeration, there are significant limitations. For example, the fruit pieces must be encased in a shredded cereal product which is alleged to be the only cereal product capable of withstanding the influence of combination with dried fruits, but even so the fruit pieces tend to be tough and the cereal portion less crisp than would be desired. Also there are critical limitations in the manner in which the cereal product must be processed or toasted to obtain the desired quality of the cereal shreds without degrading the fruit pieces, but even when operating within these limitations, there are problems in maintaining a desired fresh fruit character.

Attempts to incorporate fruit into cereal by adding fresh fruit in the form of pastes, purees and juices to cereal doughs which are then made into cereal products have encountered difficulties similar to that just previously mentioned. When the dough with the fruit product is subjected to elevated temperatures involved in cooking or otherwise processing the same, various qualities (e.g., flavor) of the fruit product are degraded.

While the discussion here presented of prior art attempts has been concerned with the utilization of fruit or fruit like products, it is quite apparent that many of the problems related thereto are also encountered when attempting to use other types of ingredients with the grain derived portion of breakfast cereals. Accordingly, it may be stated as a general object of the present invention to provide a new and improved ready-to-eat breakfast cereal, and a process for making the same, in which, in addition to the grain derived ingredient or ingredients ordinarily used in breakfast cereals, other material or ingredients are utilized in a very advantageous manner to circumvent many of the problems of the prior art.

As will become more apparent from the hereinafter disclosed preferred embodiment, the present invention is such that it alleviates in an espectially advantageous manner these aforementioned difficulties particularly as they relate to the utilization of "fruit related products," which is meant to include fruit products, fruit simulated products and combinations thereof. (The term "fruit products" as used herein refers to products which have one or more ingredients derived from fruit so as to have a fresh fruit character. "Fruit simulated products" refers to those which have one or more ingredients which, although not derived from fruit, have the general character of a fruit derived ingredient and thus have a fresh fruit character.) Because of this and in view of the highly desirable product obtained by use in the present invention of fruit related products (i.e., fruit products or fruit simulated products or combinations thereof), it is believed that the use of the same in the present invention is especially significant.

Thus, it is a more specific object to provide such a breakfast cereal and process for making the same, wherein a fruit related product is incorporated very advantageously.

In terms of the preferred embodiment of the present invention, the product of this invention can be described as a puffed or expanded fruit related product (i.e., a fruit product or a fruit simulated product) which is encased in a cover which is formed of a reconstituted grain-derived breakfast cereal product. The material so enclosed (i.e., the core material) is brought to its expanded or puffed form by means of vacuum drying. Thus it is not subjected to any elevated temperatures which could impair the quality of this core material. The cover or encasing grain-derived material is made from a reconstituted cereal product which has previously been given its desired characteristic flavor by processing steps involving elevated temperatures, and hence it is in no way necessary in the process of the present invention to subject this encasing grain-derived material to any temperature which would damage the inner core material. As indicated previously, it is apparent that temperature sensitive products other than fruit-related product could advantageously be used for the core material, and hence it is intended that the use of such other products be included within the broader aspects of the present invention.

The process of the present invention can be summarized as follows:

(1) Laying down a first sheet of a workable reconstituted dough;
(2) Depositing in a predetermined pattern discrete portions or "drop" of an expandable or puffable fruit related product onto this sheet of dough;
(3) Covering these drops with a second sheet of a workable reconstituted dough;
(4) Cutting the sheets of dough along connecting lines running between the locations of the drops of fruit-related material, the cutting being done with blunt cutting edges so as to seal the sheets one to another along the lines of cutting, thus forming a plurality of generally flattened pellets each of which has a dough cover sealed along its entire perimeter so that each cover encloses a drop of such fruit-related material, and
(5) Vacuum drying the pellets so as to puff the fruit-related core material, thus expanding each of the cover portions to a generally rounded shape. The drying is carried on until the dough becomes a crisp cereal-like casing and each core of fruit related material becomes a structurally stable, foamed material snugly held within, and in moisture equilibrium with, its related cereal casing.

To describe the process of the present invention more particularly, the initial step, as indicated previously, is to lay down a sheet of a workable reconstituted dough. The most convenient manner of doing this is first to take a commercially available ready-to-eat breakfast cereal that is a grain derived product (e.g. Wheaties, Cheerios, one of the varieties of "corn flakes," etc.) and mix the same with water, and then pass the resulting dough between a pair of sheeting rolls. Such a dough will tend to have a somewhat loose consistency; so, to give the dough a fair degree of cohesiveness it is preferred, prior to mixing the cereal with water, to fine grind the cereal product not necessarily to a powder, but to a particle size at which it will pass through a U.S. Standard No. 10 screen. Such a dough, after being sheeted, can readily be formed into cohesive dough pellets, and will, as a finished product, provide a cereal-like casing which will hold up under subsequent handling, packaging, etc. It is possible also to mix whole cereal flakes or puffed units with water and press the same into sheets, but the dough sheet so made is generally less cohesive than that achieved by first grinding up the cereal product.

The temperature at which this mixing of the cereal product and water takes place is not critical (provided, of course, that the temperature is not so extreme as to degrade the quality of the product), and it is most conveniently carried on at room temperature. The mixing can be done in any one of a number of conventional mixing methods well known in the prior art. The optimum moisture content of this dough will vary somewhat, depending on the cereal product used and the manner in which the dough is sheeted, but will ordinarily be between about 25% to 35% water, based on total weight. This moisture content is only critical in the sense that it should be such as to give the dough a consistency where it can easily be sheeted, and then cut and sealed to make pellets.

It is to be understood, of course, that various ingredients could be used in addition to the cereal product and water. For example, certain flavoring ingredients (such as honey, chocolate, peanut butter, fruit juice concentrates) could be used to modify or enhance the characteristic flavor of the cereal product which is the main ingredient. Also ingredients might be added which besides possibly adding flavor would give a different quality to the texture or cohesiveness of the dough. Examples of such ingredients are starch, lactose and other sugars, soy protein, and lecithin.

Of course, it is to be understood that the term "reconstituted" dough is to be construed more broadly than dough utilizing as a cereal base a commercially available ready-to-eat breakfast cereal, and is meant to include any cereal derived product which has been processed to give it the quality of a ready-to-eat breakfast cereal. To explain this latter statement more fully, in most breakfast cereal making processes, grain particles, water and other ingredients are cooked, usually under pressure, to make a workable gelatinized dough having a moisture content of from 25–35%. This dough, although quite edible, does not have the desired flavor and other characteristics for a high quality ready-to-eat breakfast cereal. The final desired flavor and texture is usually developed by subjecting the dough to intensive heat transfer (as in an oven or a puffing gun), this intensive heat transfer step being commonly referred to as "toasting" or "puffing" or "puffing and toasting," depending upon the precise manner in which it is carried out. Thus the term "reconstituted dough" is intended to include a dough made from a cereal product which has previously been subjected to cooking and then to toasting or puffing or toasting and puffing, so as to give it the quality of a ready-to-eat breakfast cereal.

The most convenient manner of shaping the reconstituted dough into a sheet is to pass the dough through a pair of sheeting rolls to form a sheet having a thickness of about .01 inch. However, other methods of sheeting the dough (e.g., extrusion) will suggest themselves to those skilled in the art. If sheeting rolls are used, one of the rolls can be formed with a plurality of grooves so that one surface of the dough sheet (preferably the exposed surface) will be formed with a pattern or ridges.

As indicated previously, after a first sheet of reconstituted dough is laid down, a sirupy fruit related product (the character of which will be described more fully hereinafter) is deposited onto the dough sheet in the form of discrete drops in a regular pattern. Ordinarily, these drops will be arranged in straight rows so that any group of four adjacent drops will form a square of a uniform size. Commercial apparatus for depositing drops of material in this manner is well known in the art, and will usually comprise a plurality of small discharge nozzles combined with means to eject charges of material therethrough.

After the drops of material are so deposited on the first sheet, a second sheet of reconstituted dough material, similar to the first sheet, is laid down over the first sheet so that the drops of fruit related material are sandwiched between the two sheets. This second sheet also may be formed in a manner that its exposed surface has a pattern of ridges thereon.

Next, these two sheets with the drops of fruit related material therebetween are cut both transversely and longitudinally along lines reaching between the location of the drops. The cutting edges are somewhat blunt, so that each edge, besides performing its cutting function, also seals the two dough sheets one to the other along the line of cutting. Thus, there is formed a plurality of square, somewhat flattened pellets, each having a drop of fruit related material therein. Each pellet is sealed along the entire perimeter thereof so as to be substantially closed.

The dough pellets are then subjected to a vacuum drying process to: (1) puff, foam, or expand the fruit related interior or core material of each pellet, which expansion pushes the dough cover outwardly to a generally rounded configuration, and (2) dry the pellets so that the cover becomes a crisp cereal casing having a moisture content of about 3% and the inner material becomes a structurally stable, foamed core material in moisture equilibrium with its related cereal casing. Each drop of fruit related material, in pushing its related cereal cover outwardly, creates in its cereal cover a rather large cavity, substantially the entire volume of which is occupied by the expanded material. The fruit related inner material fits snugly within its related cereal cover and adheres thereto to a moderate degree so that the shell with its fruit related foamed inner material forms a rigid structure. Although variations in conditions and methods of accomplishing this puffing and drying will suggest themselves to those skilled in the art, and such variations are meant to be included within the broader aspects of the present invention, the vacuum drying step disclosed herein is believed to be the most desirable way of accomplishing this puffing and drying, and is believed to be especially significant in the present invention.

During the first portion of the vacuum drying process, the inner material (i.e., core material) expands to push the still pliable dough cover to the rounded shape that is desired for the end product. During the latter portion of the vacuum drying, both the dough shell or cover and the core material are dried to the extent that they become structurally stable, and the vacuum drying is continued until the overall moisture content of the pellets is such that with the cereal shell at a moisture content of about 3%, the core material is in moisture equilibrium therewith. The precise moisture level of the shell is not critical, except in a sense that if the moisture content of the shell becomes too high, e.g. as high as 6%, it loses its desired crispness and becomes somewhat soggy. (And of course the core should be sufficiently dry to be structurally stable in its foamed condition.) Also, if the core material is such that it is quite hygroscopic in comparison to the shell, the moisture content of the core would, of course, be correspondingly higher than the moisture level of the shell so as to be in moisture equilibrium with the shell. It is to be understood that since the foamed core material will usually become structurally stable at a moisture level higher than that desired for the core material of the end product, the end portion of the drying does not have to be done in a vacuum, and can be carried on at a higher pressure (e.g. atmospheric), provided that the drying temperatures are kept at a moderate level. But as a practical matter, it has been found to be most convenient to simply continue the vacuum drying until the overall moisture content of the shell and filler is such that when the two come to moisture equilibrium, the shell is at about 3% moisture level. (It is to be understood that immediately after the completion of the vacuum drying, the shell and the core may not be exactly in moisture equilibrium, but will reach this condition after standing for a moderate period of time.)

Although the precise conditions of vacuum drying will vary somewhat, depending upon the formulation of the core material, it has been found to be generally suitable that in vacuum drying the pellets, the pressure of the air surrounding the pellets be reduced from atmospheric to about 200 millimeters of mercury or lower. One method of accomplishing this is to place the pellets in a closed chamber at atmospheric pressure and then draw the air out of this chamber by means of a vacuum pump until the pressure drops to the desired level. For best results, the pressure should drop to a level of about 75 millimeters fairly quickly (i.e. in about 30 seconds) to insure proper puffing of the fruit related material. With the pressure in the chamber being held at 75 millimeters of mercury, a drying time of about 2 to 10 minutes is usually sufficient to lower the moisture content to the desired level.

Another method of accomplishing the vacuum drying process is to move the pellets through a pressure seal valve, such as a star valve, into a chamber in which the pressure is 75 millimeters of mercury, and keep the biscuits in this chamber for a period of about 2 to 10 minutes. The biscuits are then moved from the chamber through another pressure seal valve to the atmosphere. It is of course within the skill of the art to vary the time and pressure of this vacuum drying to achieve the desired puffing and drying. Various changes in the filler formula may make such changes desirable. However the pressure should not be so high (i.e., above about 200 millimeters of mercury) that the temperature at which water boils off is so high as to degrade the quality of the filler.

During the vacuum drying, the pellets will be losing heat because of the loss of moisture as gas or vapor. Hence, while being dried, the pellets are heated by infrared lamps to maintain the temperature of the pellets at a level at which the water in the pellets will boil off. (For a pressure level of 75 millimeters of mercury, this temperature will be moderately above room temperature.) The vacuum drying period can be shortened or lengthened by increasing or decreasing, respectively, the amount of heat delivered to the product. However, the pellets are at no time subjected to any temperature extremes which would degrade the fresh fruit character of the interior. Subsequent to the vacuum drying process, the pellets are in their finished form and may be packaged for eventual consumer use.

The formula for three especially desirable core materials are as follows:

|  | I | II | III |
|---|---|---|---|
|  | Percent | Percent | Percent |
| Sugar | 79 | 77 | 77 |
| Raspberry Concentrate (5 fold) |  | 6 |  |
| Citrus Concentrate |  |  | 6 |
| Egg Albumen | 0.93 | 1.0 | 0.99 |
| Artificial Blueberry flavor | 0.01 |  | 0.01 |
| Water | 20 | 16 | 16 |
| Blue No. 1 | 0.01 |  |  |
| Carbon Black | 0.05 |  |  |

The first formula is an artificial fruit flavor, the second a true fruit flavor and the third a combination of true and artificial fruit flavors. It can readily be seen that each of these three formulas comprises four main ingredients; (a) sugar, (b) water (c) egg albumen, and (d) flavoring.

Sugar is by weight the main ingredient in these preferred formulas and provides the "body" of the core material. (Sucrose is desirably the sugar used, but other sugars could also be used.) Not only is sugar as an ingredient desirable for flavor and nutritional reasons, but it readily lends itself to be mixed with other ingredients to form a slurry or sirupy liquid which can conveniently be distributed as discrete drops onto the first dough sheet. Further, the sugar will cooperate with the other ingredients to permit the core material to be puffed, and upon completion of the vacuum drying will cooperate to form a stable, foamed or puffed core structure. Various other ingredients can be used in place of or in combination with the sugar to give this "body" to the core material. For example, soy flour, wheat flour, starch, and peanut butter were found to be adequate.

Water of course gives the core material the desired liquidity so that it can be easily discharged through a nozzle. During the vacuum drying step, most of the water boils off at a low temperature to puff or foam the core material and leave a stable, puffed core structure. It is possible that other ingredients could be used in place of or in combination with water to perform the same functions, provided such other ingredients would not contaminate the products or otherwise degrade the same. However, in view of the general acceptability of water in performing these functions, and the obvious economy in using the same, efforts to find suitable substitutes would be largely academic.

With the ingredients which would more usually be used, such as the ones mentioned herein, the total amount of water used in the core material formula (including any water contributed by the fruit concentrate) can vary from about 10% to 25%, this depending somewhat upon the exact ingredient formula. At too low a water level, the core material becomes excessively thick so that it is difficult to deposit the same as drops, and the core material does not puff to the desired extent so that the texture of the core is degraded. While a moisture content above about 25% is possible, the core material tends to become excessively liquid so that when the drops of core material are deposited on the first dough sheet, the core material tends to soak into the dough to an undesired extent before the vacuum drying step can succeed in puffing the core material. This 10 to 25% range is not by any means absolute, but it covers what would generally be the most practical operating range for a commercial operation.

The egg albumen is added to these core material formulas primarily to give the core material a certain stability so that the core material will puff properly during the vacuum drying process. The amount of egg albumen used can vary within considerable limits, with as little as 0.2% of egg albumen (based on total weight of core material before drying) being sufficient to give the core material enough stability so that it will puff sufficiently. As the amount of egg albumen is increased up to about 4%, the stability of the core material increases so that it is more easily puffed by vacuum drying, but beyond this amount, there is no appreciable difference in the ease with which the puffing can be accomplished. Other ingredients could be used in the core material formula to give such stability, such as various vegetable gums (e.g. guar gum, locust bean gum, etc.), Irish moss thickening agents, fruit pectins, carboxymethyl cellulose, etc.

In choosing the flavoring ingredient or ingredients for the core material, the field of selection is understandably quite broad, and could include such varied flavoring ingredients as fruit flavors, nut flavors, honey flavor, spice, mint, caramel, malt, coffee, meat, vegetable, maple butter, rum and other liquor, etc. However, since it is of special importance in the present invention to permit the advantageous use of a fruit or fruit simulated product having a fresh fruit character, the selected flavoring ingredients for the core material are, in the preferred embodiments, fruit and fruit simulated products. In the first formula given previously herein, an artificial blueberry flavor is used with some dye ingredients. In the second filling formula, where raspberry concentrate (a true fruit ingredient) is used, the concentrate itself supplies a certain amount of moisture to the core material, so that a lesser amount of water is added as compared to the first formula. In the third formula, where a citrus fruit concentrate is used in combination with artificial flavoring ingredients, the citrus fruit concentrate itself has sufficient moisture so that a lesser amount of water is used as compared to the first formula.

It is also practical to incorporate dried comminuted fruit particles into the core material. Desirably these should be of a particle size such that they would pass through a U.S. No. 12 screen. Or a fruit paste can also be utilized in this core material. The amount of fruit or fruit paste would depend upon the quality desired for the end product and can vary from zero to fifty percent by weight of the core material and produce a very desirable product.

It is apparent that within the broader aspects of the present invention, a great many ingredients could be used in the core material other than those shown herein, provided that the combination of such ingredients are initially sufficiently liquid to be deposited on the dough sheet and admit of being subsequently puffed and dried. It is possible that the use of one ingredient may well serve the function of one or more of the main core material ingredients given herein. For example, perhaps a suitable substitute could be used for sugar, which needs no additional flavoring and/or needs no added ingredient to give it cohesiveness so that it will puff. Also, such an ingredient in its normal condition may itself have sufficient moisture content so that no additional water would be needed.

The invention is shown with more particularity in the following examples.

EXAMPLE I

A batch of "Cheerios" is ground and mixed with water at a ratio of 75% Cheerios to 25% water, to make a workable dough. One portion of this dough is fed through a pair of rolls to form the same into a sheet. Next, discrete drops of a sirupy material made by mixing the ingredients given in formula No. 1 for core materials given previously herein, are deposited in a regular pattern onto the sheet of dough. These drops are each about .07 gram and are spaced about three quarters of an inch apart in a generally square pattern. A second portion of dough is fed through a pair of sheeting rolls to form the same into a second sheet, and this second sheet is placed over the first sheet and over the drops of the core material. The two sheets, with the core material therebetween, are cut with a blunt edge both longitudinally and transversely along lines reaching between the drops of core material, to form a plurality of flattened square pellets, each of which is closed about its entire perimeter and contains therein a respective drop of said core material. The dough pellets are then placed in a vacuum oven for three minutes, the pressure in the vacuum oven being 75 millimeters of mercury. At the end of three minutes the product is removed from the vacuum oven, the resulting product being a plurality of cereal units, each of which has a crisp cereal cover and a puffed, structurally stable core material therewithin.

EXAMPLE II

The same process is followed as in Example I, except that "Wheaties" is used instead of "Cheerios" to make the workable dough.

EXAMPLE III

The same process is followed as in Example I, except that the formulation No. 2 for the core material is used instead of the formulation No. 1.

EXAMPLE IV

The same process is followed as in Example I, except that the formulation No. 3 for the core material is used instead of the formulation No. 1.

It should be understood that the foregoing is merely illustrative of a certain embodiment of the invention and many variations may be made by those skilled in the art Now therefore we claim:

1. A process for making a ready-to-eat breakfast cereal, said process comprising:
   (a) laying down a first sheet of a workable reconstituted cereal dough,
   (b) depositing portions of an edible product initially sufficiently liquid to be deposited on the dough sheet and capable of being puffed and dried at predetermined locations on said first sheet of cereal dough,
   (c) laying over said first sheet a second sheet of a workable reconstituted cereal dough to cover said portions of said product,
   (d) cutting and sealing said cereal dough sheets along lines between the location of said portions so as to separate said sheets into substantially sealed dual layered cereal dough pellets, each of which encloses a respective portion of said product, and
   (e) expanding and vacuum drying said cereal dough pellets so that the cereal dough contains less than 6% moisture and that in each pellet the enclosed product expands internally to push the surrounding layers of cereal dough outwardly to a generally rounded configuration, said vacuum drying being carried on to the extent that in each pellet said enclosed product becomes a structurally stable material.

2. The process as recited in claim 1, wherein said puffing and drying is done by vacuum drying at a pressure between zero to aboue 200 millimeters of mercury.

3. The process as recited in claim 2, wherein said foamable product is a fruit related product comprising sugar, water and a fruit related ingredient, said product being sufficiently stable to permit foaming of said product.

4. The process as recited in claim 3, wherein said fruit related product is, by weight, about 10–25% water prior to the vacuum drying.

5. A process for making a ready-to-eat breakfast cereal, said process comprising:
   (a) laying down a first sheet of a workable reconstituted cereal dough,
   (b) depositing portions of a temperature sensitive product at predetermined locations on said first sheet of cereal dough, said product comprising sugar, water and a fruit related ingredient containing about 10–25% moisture, said product being sufficiently stable so as to be able to be formed,
   (c) laying over said first sheet a second sheet of a workable reconstituted cereal dough to cover said product,
   (d) cutting and sealing said cereal dough sheets along lines between the location of said portions so as to separate said sheets into substantially sealed dual layered cereal dough pellets, each of which encloses a respective portion of said product, and
   (e) vacuum drying said pellets at a pressure between zero and about 200 millimeters of mercury so that the enclosed product of each pellet expands internally to push the surrounding layers of cereal dough outwardly to form a generally rounded cover, and carrying on said vacuum drying so that each drop forms a structurally stable foamed core material and the cereal dough contains less than about 6% moisture.

References Cited
UNITED STATES PATENTS

| | | | |
|---|---|---|---|
| 1,787,900 | 1/1931 | Goff | 107—1 |
| 2,693,419 | 11/1954 | Gager | 99—83 |
| 3,057,732 | 10/1962 | Conrad et al. | 99—92 |
| 3,250,625 | 5/1966 | Thelen | 99—86 |

RAYMOND N. JONES, *Primary Examiner.*